United States Patent
Nozaki

[11] Patent Number: 5,918,421
[45] Date of Patent: Jul. 6, 1999

[54] DOOR WEATHER STRIP MOUNTING STRUCTURE

[75] Inventor: Masahiro Nozaki, Aichi, Japan

[73] Assignee: Toyoda Gosei Co., Ltd., Aichi-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/736,658

[22] Filed: Oct. 25, 1996

[30] Foreign Application Priority Data

Nov. 2, 1995 [JP] Japan .................................... 7-309886

[51] Int. Cl.$^6$ ...................................................... E06B 7/16
[52] U.S. Cl. ........................ 49/492.1; 49/498.1; 49/475.1
[58] Field of Search .................................. 49/506, 475.1, 49/498.1, 493.1, 492.1

[56] References Cited

U.S. PATENT DOCUMENTS

| | | | |
|---|---|---|---|
| 4,858,385 | 8/1989 | Bright | 49/498.1 X |
| 5,361,542 | 11/1994 | Dettloff | 49/498.1 X |
| 5,389,409 | 2/1995 | Iwasa et al. | 49/498.1 X |

FOREIGN PATENT DOCUMENTS 3159128  7/1988  Japan .................................... 49/493.1

*Primary Examiner*—Jerry Redman
*Attorney, Agent, or Firm*—Pillsbury Madison & Sutro LLP

[57] ABSTRACT

The door weather strip mounting structure is constructed such that a base portion of a door weather strip on an inside thereof, is fixed to an outer by clips and, on an outside thereof, is bonded to the outer peripheral portion through a two-sided adhesive tape. Due to this structure, when the tape is bonded, a releasing sheet can be easily removed from the two-side adhesive tape and, at the same time, when a vehicle door is closed, the clips prevent the inside end portion of the base portion from being floated upwardly.

17 Claims, 2 Drawing Sheets

DOOR WEATHER STRIP MOUNTING STRUCTURE

This application is based on application Ser. No. 7-309886, filed in Japan on Nov. 2, 1995, the content of which is incorporated hereinto by reference.

BACKGROUND OF THE INVENTION

1. Field of the Invention

The present invention relates to a structure for mounting a door weather strip to the peripheral portion of a door frame of a door of a vehicle body.

2. Related Art

As a structure for mounting a weather strip to the peripheral portion of a vehicle door or in the portion of a vehicle body that is connected with the opening of the door, there is generally known a structure in which the base portion of a weather strip is fitted with a retainer provided in a weather strip mounting surface. Recently, the retainer has been omitted and, instead, the base portion of the weather strip is bonded directly to the weather strip mounting surface by use of a piece of tape which has adhesive on both sides thereof (which is hereinafter referred to as two-sided adhesive tape). In this case, one of the two surfaces of a piece of belt-shaped two-sided adhesive tape is first bonded to the base portion of the weather strip and the other surface is then bonded to the weather strip mounting surface, so that the weather strip can be mounted onto the weather strip mounting surface.

However, since there is a possibility that, when bonding the other surface of the two-sided adhesive tape to the weather strip mounting surface, it can be bonded to the weather strip mounting surface at an undesired position. Thus, there is employed a method which uses the two-sided adhesive tape and clips in combination, as disclosed in Japanese Utility Model Publication No. Hei. 7-26205. As shown in FIG. 4, a door weather strip 3 is mounted on the outer peripheral portion 11 of a door frame 1 (FIG. 3) of a vehicle door. In this door weather strip, clips 5 are disposed in a base portion 31 of the door weather strip 3, in particular, in the central portion of the base portion 31 in the width direction thereof at a given interval from one another in such a manner that they extend through two-sided adhesive tape 6 bonded to the bottom surface of the base portion 31. The respective clips 5 are pushed into holes formed respectively in the outer peripheral edge 11 of the door frame 1, and the door weather strip 3 can be bonded to the door outer peripheral portion 11 by use of the two-sided adhesive tape 6. The adhesive tape 6 serves also as a seal member to seal between the door weather strip base portion 31 and the door frame outer peripheral portion 11. Reference character 32 shown in FIG. 4 designates a hollow seal portion which is to be pressed against the door opening portion 2 of a vehicle body when the door is closed, while character 33 stands for a sub-seal lip extending to the inner surface of the outer peripheral projection edge 12 of the door frame 1.

However, in the above-mentioned conventional clips and tape combined structure, the following problems remain to be solved. Firstly, whenever the door is closed, the hollow seal portion 32 is pushed in a vehicle outward direction by the door opening portion 2 of the vehicle body, which applies such a force to an inside end portion of the base portion 31 to move the same end portion in the floating direction thereof. This may raise a problem in that the two-sided adhesive tape 6 can be peeled off at the inside end portion of the base portion 31. If such adhesion peel-off occurs once, it will spread gradually toward the outside of the vehicle.

Secondly, since a releasing sheet (not shown in FIG. 4) is attached to the other surface of the two-sided adhesive tape 6 having one surface previously bonded to the bottom surface of the base portion 31 in such a manner that the present releasing sheet covers the other surface of the two-sided adhesive tape 6, the parting sheet must be removed from the other surface of the tape 6. However, because a large number of clips 5 are so disposed as to extend through the releasing sheet and thus they can be easily caught by the parting sheet, the releasing sheet is difficult to release.

SUMMARY OF THE INVENTION

In view of the above circumstances of the conventional structure for mounting a weather strip, the present invention aims at eliminating the drawbacks of the conventional structure. Accordingly, it is an object of the invention to provide a door weather strip mounting structure for mounting a door weather strip including a hollow seal portion to be pressed against the door opening portion of a vehicle body, a base portion for mounting to the outer peripheral portion of a door frame by combined use of clips and a two-sided adhesive tape, which can prevent the two-sided adhesive tape against adhesion peel-off and can facilitate an operation to remove a releasing sheet from the two-sided adhesive tape.

In attaining the above object, according to the invention, there is provided a door weather strip mounting structure in which, as shown in FIG. 1, clips 5 and a piece of two-sided adhesive tape 6 are disposed at mutually off-set (or spaced) positions at a base portion 41 of a door weather strip 4A, in an inside portion thereof. The base portion 41 is positioned at and fixed to a door frame outer peripheral portion 11, while an outside portion of the base portion 41 is bonded through the two-sided adhesive tape 6 to the door frame outer peripheral portion 11.

According to the invention, at the time when the door weather strip 4A is mounted, the clips 5 are divided from the two-sided adhesive tape 6, therefore, the releasing sheet can be released easily. Also, since the inside portion of the base portion 41 is fixed by the clips 5 tightly, the base portion 41 is prevented from separating from the door frame outer peripheral portion 11 even when the base portion 41 receives a strong floating-direction force when the door is closed. On the other hand, because the outside portion of the base portion 41, when the door is closed, is given a force in a direction to press the same against the door frame outer peripheral portion 11, the adhesive or bonded state of the two-sided adhesive tape 6 can be kept in place.

DESCRIPTION OF THE PREFERRED EMBODIMENTS

Figure 1:
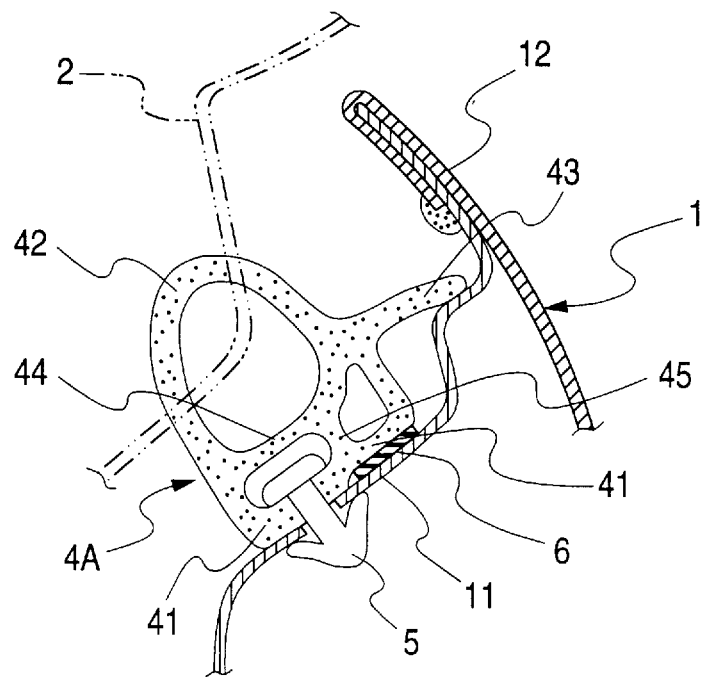
FIG. 1 is a sectional view of a first embodiment of a door weather strip mounting structure according to the invention, taken along the line A—A shown in FIG. 3.

According to a first embodiment of the present invention shown in FIG. 1, an outer peripheral portion 11 of a door frame 1 is formed as a weather strip mounting surface which is substantially flat, and a projection edge 12 is provided on and projects from the outer end of the outer peripheral portion 11.

A door weather strip 4A, which is formed of sponge rubber, is formed with a base portion 41, a hollow seal portion 42 bulged out upwardly from the base portion 41, and a sub-seal lip 43 extending out from the outer side wall of the hollow seal portion 42 and having a leading end to be contactable with the outer peripheral edge 11. In the bottom portion of the hollow seal portion 42, there is provided a bridge 44 connecting two side walls of the hollow seal portion 42, and a bridge 45 connecting the central portion of the bridge 44 and the central portion of the base portion 41, both of which cooperate together in applying a form retaining ability to the lower portion of the door weather strip 4A.

Referring further to the structure of the door weather strip 4A, an inside portion of the base portion 41 partitioned by the bridge 45 is fixed to the outer peripheral portion 11 of the door frame 1 by the clips 5 at a given interval in the longitudinal direction of the base portion 41, while an outside portion of the base portion 41 is bonded to the outer peripheral portion 11 through the two-sided adhesive tape 6.

To mount the door weather strip 4A, first the head portions of the clips 5 are respectively pushed into and mounted to the inside portion of the base portion 41 and also the belt-shaped two-sided adhesive tape 6 is bonded to the base portion 41 along the outside portion thereof. Then, a releasing sheet, which was previously bonded to the adhesive surface of the two-sided adhesive tape 6 to be bonded to the door frame outer peripheral portion 11, is released from the adhesive surface and the respective clips 5 are press-fitted into clip holes respectively formed in the outer peripheral portion 11 to thereby position accurately the door weather strip 4A and, at the same time, the two-sided adhesive tape 6 is pressed against and bonded to the door frame outer peripheral portion 11.

As described above, according to the above-mentioned structure of the door weather strip 4A, removal of the releasing sheet of the two-sided adhesive tape 6 can be achieved easily without being interfered with by the clips 5. In addition, when the door is closed, although the hollow seal portion 42 of the door weather strip 4A is pushed in the vehicle outside direction by the door opening portion 2 of the vehicle body to thereby apply such a force to the inside end portion of the base portion 41 which tries to float the same upwardly, the inside end portion of the base portion 41 is prevented from floating or moving upwardly because the inside portion of the base portion 41 is secured by the clips 5.

On the other hand, a force is applied to the outside portion of the base portion 41, when the door is closed, to press the base portion 41 against the door frame opening portion 11. Due to this, the bonded force of the two-sided adhesive tape 6 can be kept strongly and a good sealing condition can be maintained.

Figure 2:
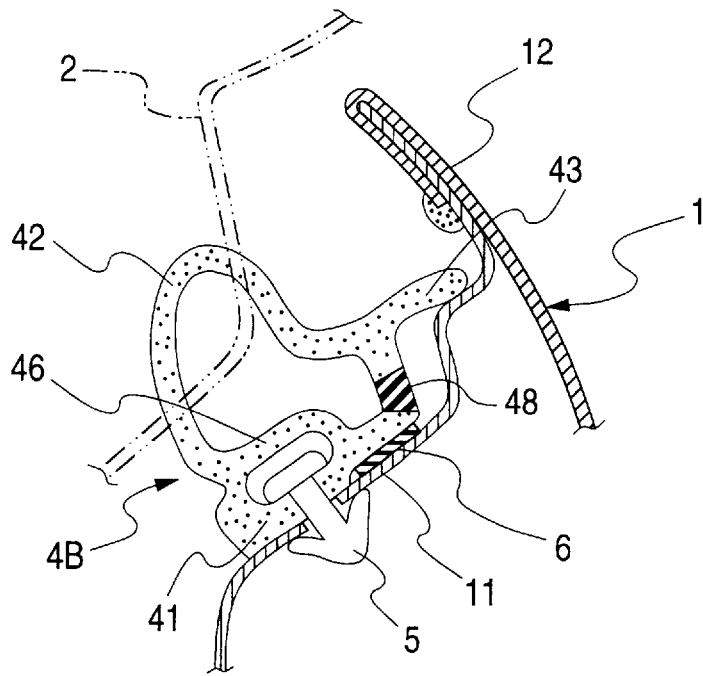
FIG. 2 is a sectional view of a second embodiment of a door weather strip mounting structure according to the invention, taken along the line A—A shown in FIG. 3.
Figure 3:
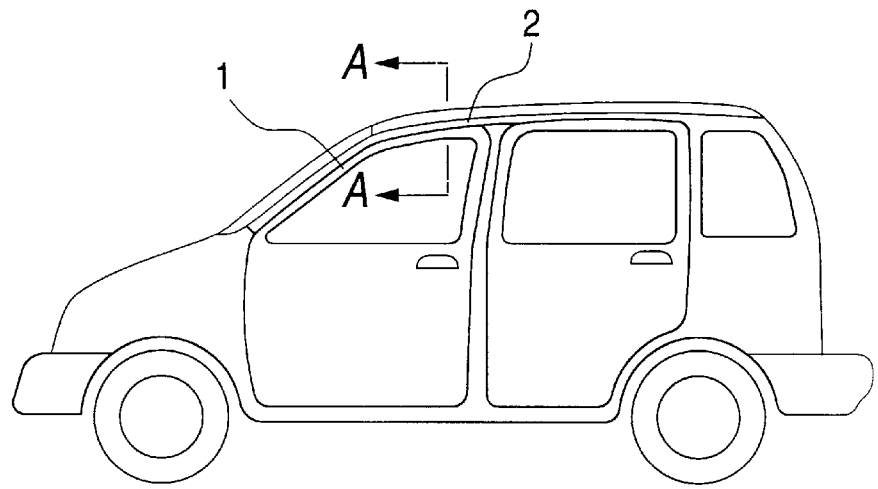
FIG. 3 is a side view of a vehicle to which the present invention is applied; and, FIG. 4 is a sectional view of a conventional door weather strip mounting structure, taken along the line A—A shown in FIG. 3.
Figure 4:
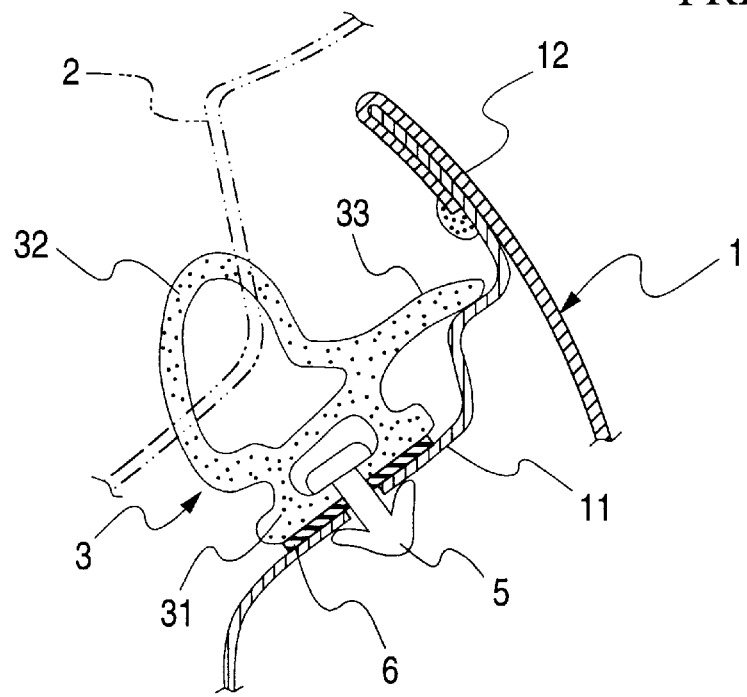

FIG. 2 shows a second embodiment of a door weather strip mounting structure according to the invention. Description will be given below of the structure of the second embodiment, focusing on merely different points between the first embodiment and the second embodiment. Thus like ports are given like numerals.

In the lower portion of a door weather strip 4B, there is provided a bridge 46 which connects the inner side wall of the hollow seal portion 42 with the central portion of the base portion 41. Referring to the structure of the present base portion 41, the inside portion thereof including the bridge 46 is positioned at and fixed to the door frame outer peripheral portion 11 by the clips 5, while the outside portion of which is bonded to the outer peripheral portion 11 through the two-sided adhesive tape 6. The remaining portions of the structure of the second embodiment are substantially the same as those of the first embodiment.

In the second embodiment, the door weather strip 4B does not include a bridge which connects the outer side wall of the door weather strip 4B with the inner side wall. Therefore, the hollow seal portion 42 is lower in rigidity than that employed in the first embodiment and thus a reaction force given by the door opening portion 2 of the vehicle body when the door is closed is smaller. This means that the present embodiment is suitable for a case in which it is required to lower a force for closing the door. In the second embodiment, of course, there is no possibility that the inside end portion of the base portion 41 of the door weather strip 4B can be floated or moved upwardly. On the outside portion of the base portion 41, although a force to press the same end portion against the door frame outer peripheral portion 11 is smaller than the previous embodiment, there is no fear at all that an adhesion peel-off phenomenon can occur in the same end portion.

Here, if a solid rubber member 48 is provided integrally in a connecting portion between the outer side wall of the hollow seal portion 42 and the base portion 41, then a force to press against the door frame outer peripheral portion 11 can be transmitted more positively when the two-sided adhesive tape 6 is pressed and bonded and also when the door is closed.

As has been described heretofore, according to the invention, in a door weather strip mounting structure using a combination of clips and two-sided adhesive tape, by off-setting the positions of the clips and two-sided adhesive tape, the efficiency of the bonding operation of the two-sided adhesive tape can be improved as well as the peel-off of the two-sided adhesive tape can be prevented.

While the invention has been described in connection with what is presently considered to be the most practical and preferred embodiment, it is understood that the invention is not limited to the disclosed embodiment but, on the contrary, is intended to cover various modifications and equivalent arrangements included within the spirit and scope of the appended claims.

What is claimed is:

1. A door weather strip disposed between an outer peripheral portion of a door frame and a vehicle body, comprising:

a base port ion mounted to one of the outer peripheral portion of the door frame and a peripheral portion of a door opening portion of the vehicle body, a said base portion comprising an inside portion extending along an inner side of a vehicle and an outside portion extending along an outer side of the vehicle, said inside portion being disposed inside a central portion of said base portion extending in a longitudinal direction of said base portion;

a hollow seal portion projecting from said base portion, said hollow seal portion being compressed between the vehicle body and a vehicle door when the vehicle door is closed;

clip members disposed at and spaced at intervals along said inside portion of said base portion for temporarily fixing said clip members to one of the vehicle body and the vehicle door, wherein each of said clip members comprises a head portion mounted within said hollow seal portion, a leg portion protruded downwardly from said head portion, and a locking piece extending upwardly and slantingly from a portion of said leg portion; and two sided adhesive tape extended in parallel with a line defined by said clip members so as to bond one of the outer peripheral portion of the door frame and the peripheral portion of the door opening portion of the vehicle body, wherein the tape is disposed outside a range of interference with the clip member, said range of interference being defined by a region on the base portion which is interposed between said locking piece and said head of the clip member, and wherein a bridge member for covering said head portion is provided within said hollow seal portion.

2. The door weather strip of claim 1, wherein said bridge member comprises a first bridge connecting two side walls of said hollow seal portion and a second bridge connecting substantially a central portion of said first bridge and substantially said central portion of said base portion.

3. The door weather strip of claim 2, wherein said inside portion of said base portion is defined substantially at an inner side from said second bridge and said outside portion of said base portion is defined substantially at an outer side from said second bridge.

4. The door weather strip of claim 1, wherein said bridge member connects an inner side wall of said hollow seal portion with said central portion of said base portion, and said bridge member is L-shaped in a cross-section.

5. The door weather strip of claim 4, further comprising a solid rubber member formed integrally with said base portion and said hollow seal portion in a connecting portion between an outer side wall of said hollow seal portion and said base portion.

6. The door weather strip of claim 1, further comprising a solid rubber member formed integrally with said base portion and said hollow seal portion in a connecting portion between an outer side wall of said hollow seal portion and said base portion.

7. The door weather strip of claim 1, further comprising a sub-seal lip extending outwardly from an outer side wall of said hollow seal portion, said sub-seal lip having a leading end to be contactable with said outer peripheral portion of said door frame.

8. The door weather strip of claim 1, in which said base portion has a bottom surface which is provided with a stepped part for dividing said bottom surface into a projected portion on which said clip members are disposed and a recessed portion on which said two-sided adhesive tape is disposed.

9. A door weather strip mounting structure, the mounting structure comprising:

a base portion of a door weather strip capable of being mounted to the outer peripheral portion of the door frame;

a hollow seal portion projecting from said base portion, said hollow seal portion capable of being pressed against a peripheral portion of a door opening portion of a vehicle body when a vehicle door is closed, said door opening portion being defined by the vehicle door opened from said vehicle body;

clip members capable of fixing an inside portion of said base portion which extends along an inner side of the vehicle to the outer peripheral portion of the door frame said inside portion being disposed inside a central portion of said base portion extending in a longitudinal direction of said base portion, wherein each of said clip members comprises a head portion mounted within said hollow seal portion, a leg portion protruded downwardly from said head portion, and a locking piece extending upwardly and slantingly from a portion of said leg portion; and two-sided adhesive tape extended in parallel with a line defined by said clip members and disposed between an outside portion of said base portion, which extends along an outer side of the vehicle, and the outer peripheral portion of the door frame, wherein said tape is disposed outside a range of interference with the clip member, said range of interference being defined by a region on the base portion which is interposed between said locking piece and said head of the clip member, and wherein a bridge member for covering said head portion is provided within said hollow seal portion.

10. The door weather strip mounting structure of claim 9, wherein said bridge member comprises a first bridge connecting two side walls of said hollow seal portion and a second bridge connecting substantially a central portion of said first bridge and substantially said central portion of said base portion.

11. The door weather strip mounting structure of claim 10, wherein said inside portion of said base portion of said door weather strip is defined substantially at an inner side from said second bridge and said outside portion of said base portion is defined substantially at an outer side from said second bridge.

12. The door weather strip mounting structure of claim 9, wherein said bridge member connects an inner side wall of said hollow seal portion with said central portion of said base portion, and said bridge member is L-shaped in a cross-section.

13. The door weather strip mounting structure of claim 12, wherein said door weather strip further comprises a solid rubber member formed integrally with said base portion and said hollow seal portion in a connecting portion between an outer side wall of said hollow seal portion and said base portion.

14. The door weather strip mounting structure of claim 9, wherein said door weather strip further comprises a sub-seal lip extending out of an outer side wall of said hollow seal portion, said sub-seal lip having a leading end to be contactable with said outer peripheral portion of said door frame.

15. The door weather strip mounting structure of claim 9, wherein said base portion has a bottom surface which is provided with a stepped part for dividing said bottom surface into a projected potion on which said clip members are disposed and a recessed portion on which said two-sided adhesive tape is disposed.

16. The door weather strip mounting structure of claim 9, wherein said door weather strip further comprises a solid rubber member formed integrally with said base portion and said hollow seal portion in a connecting portion between an outer side wall of said hollow seal portion and said base portion.

17. A method for mounting a door weather strip to an outer peripheral portion of a door frame of a vehicle, comprising steps of:

pushing a head portion of each of a plurality of clip members into a respective inside portion of a base portion of the door weather strip, said respective inside portion being disposed inside a central portion of said base portion extending in a longitudinal direction of said base portion;

bonding one side of a two-sided adhesive tape to the base portion of the door weather strip along an outside portion thereof, said adhesive tape being arranged in parallel with a line defined by said clip members and outside a range of interference with said clip members;

provisionally mounting a leg portion which protrudes downwardly from the head portion of each of said clip members on one of clip holes formed in the outer peripheral portion of the door frame;

removing a releasing sheet which is attached to the other side of the two-sided adhesive tape; and pressing the other side of the two-sided adhesive tape against the outer peripheral portion of the door frame, wherein said range of interference being defined by a region on the base portion which is interposed between said head of said clip member and a locking peice extending upwardly and slantingly from a portion of said leg portion.

\* \* \* \* \*